(12) United States Patent
Gutierrez et al.

(10) Patent No.: US 7,559,528 B2
(45) Date of Patent: Jul. 14, 2009

(54) MANUAL LOCK PIN WITH LANYARD

(75) Inventors: Javier Gutierrez, Chandler, AZ (US);
Raul Velasquez, El Mirage, AZ (US);
Joel E. Labenz, Chandler, AZ (US);
Michael H. Borns, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 264 days.

(21) Appl. No.: 11/479,862

(22) Filed: Jun. 30, 2006

(65) Prior Publication Data

US 2008/0001109 A1 Jan. 3, 2008

(51) Int. Cl.
*F16K 35/00* (2006.01)

(52) U.S. Cl. .............................. 251/93; 251/90; 70/177; 70/179

(58) Field of Classification Search .................... 251/90, 251/93; 70/174, 175, 177, 179
See application file for complete search history.

(56) References Cited

U.S. PATENT DOCUMENTS

| | | | |
|---|---|---|---|
| 3,743,239 A | 7/1973 | Heckrotte, Sr. et al. | |
| 4,458,510 A | 7/1984 | Nielsen | |
| 4,971,289 A | 11/1990 | Pietras | |
| 5,046,523 A | 9/1991 | Horhota | |
| 5,116,018 A | 5/1992 | Friemoth et al. | |
| 5,190,263 A * | 3/1993 | Roberts | 251/60 |
| 5,329,959 A * | 7/1994 | Owen et al. | 137/315.17 |
| 5,370,148 A * | 12/1994 | Shafer | 137/15.25 |
| 6,196,268 B1 | 3/2001 | Steiner et al. | |
| 6,205,826 B1 | 3/2001 | Neeley | |
| 6,273,125 B1 | 8/2001 | Blenkush et al. | |
| 6,361,017 B1 | 3/2002 | Nimberger et al. | |
| 6,398,184 B1 | 6/2002 | Sowada et al. | |
| 6,604,391 B2 | 8/2003 | Vellette et al. | |
| 6,640,688 B1 | 11/2003 | Harper | |
| 6,691,737 B2 * | 2/2004 | Muller et al. | 137/556 |

(Continued)

FOREIGN PATENT DOCUMENTS

FR 2638218 4/1990

(Continued)

OTHER PUBLICATIONS

EP Search Report, 07111274.2-2422, dated Oct. 19, 2007.

*Primary Examiner*—John K Fristoe, Jr.
(74) *Attorney, Agent, or Firm*—Ingrassia Fisher & Lorenz, P.C.

(57) ABSTRACT

An apparatus is provided for a valve assembly comprising a valve body, a valve element, an actuator housing, an actuator, an unlocked storage opening, a locked storage opening, and a lock. The valve body has an inlet port, an outlet port, and a flow passage therebetween. The valve element is movably disposed within the valve body flow passage. The actuator is disposed within the actuator housing, coupled to the valve element, and operable to move the valve. The unlocked and locked storage openings are formed in the actuator housing. The lock is selectively insertable into, and movable between, the unlocked and locked storage openings. When in the unlocked storage opening, the lock does not engage the actuator, and valve movement is thereby allowed. When in the locked storage opening, the lock engages at least a portion of the actuator, thereby at least inhibiting valve movement.

20 Claims, 5 Drawing Sheets

U.S. PATENT DOCUMENTS

| | | |
|---|---|---|
| 6,896,239 B1 | 5/2005 | Brenes |
| 6,935,610 B1 | 8/2005 | DeBruyne |
| 7,219,685 B1 * | 5/2007 | Espinoza ................... 137/385 |
| 2002/0047101 A1 | 4/2002 | Buchwald |

FOREIGN PATENT DOCUMENTS

| | | |
|---|---|---|
| WO | 0050793 A1 | 8/2000 |
| WO | 02079680 A1 | 10/2002 |

* cited by examiner

MANUAL LOCK PIN WITH LANYARD

TECHNICAL FIELD

The present invention generally relates to a valve assembly, and more specifically to a valve assembly with a lock.

BACKGROUND

Valves are used to control air, gases or other fluids in various types of apparatus and vehicles, such as aircraft. For example, valves can be used to control the supply of bleed air on aircraft by opening, closing, or partially obstructing various passageways, among various other valve uses. There are many different types of valves used in aircraft, other vehicles, and other apparatus, such as butterfly valves, ball valves, and check valves, among others.

By way of example only, a particular type of butterfly valve has a valve element positioned in the center of a flow passage, with a shaft connected thereto. The valve element is movable to an open position through movement of the shaft such that the valve element is parallel to the flow of air or other fluid, thereby allowing the flow of fluid through the valve passage. Conversely, the valve element is movable to a closed position through movement of the shaft such that the valve element is perpendicular to the flow of fluid, thereby restricting the flow of fluid through the valve passage. The shaft and the valve element can be movable in this manner through a spring force, pneumatic means, or some other means.

In some instances, it may be desirable to include a manual mechanism for locking or unlocking the valve, for example in the highly unlikely event that some valve part may not function properly. It is also desirable for users, such as aircraft crew members, or operators of other vehicles or apparatus, to be able to lock or unlock the valve with a single hand, and/or where visibility may be impaired.

Accordingly, there is a need for an assembly for locking or unlocking a valve, and for operators to be able to lock or unlock the valve with a single hand, and/or where visibility may be impaired. The present invention addresses one or more of these needs.

BRIEF SUMMARY OF THE INVENTION

An apparatus is provided for an assembly for a valve. In one embodiment, and by way of example only, the assembly is a valve assembly comprising a valve body, a valve element, an actuator housing, an actuator, an unlocked storage opening, a locked storage opening, and a lock. The valve body has an inlet port, an outlet port, and a flow passage therebetween. The valve element is movably disposed within the valve body flow passage. The actuator is disposed within the actuator housing, coupled to the valve element, and operable to move the valve. The unlocked storage opening and the locked storage opening are formed in the actuator housing. The lock is selectively insertable into, and movable between, the unlocked storage opening and the locked storage opening. When the lock is in the unlocked storage opening, the lock does not engage the actuator, and valve movement is thereby allowed. When the lock is in the locked storage opening, the lock engages at least a portion of the actuator, and valve movement is thereby at least inhibited.

In another embodiment, and by way of example only, the assembly is an actuator assembly comprising an actuator housing, an actuator, an unlocked storage opening, a locked storage opening, and a lock. The actuator is disposed within the actuator housing, and is configured to couple to a valve element. The unlocked storage opening and the locked storage opening are formed in the actuator housing. The lock is selectively insertable into, and movable between, the unlocked storage opening and the locked storage opening. When the lock is in the unlocked storage opening, the lock does not engage the actuator. When the lock is in the locked storage opening, the lock engages at least a portion of the actuator.

In yet another embodiment, and by way of example only, the assembly is an actuator housing comprising a main body, an unlocked storage opening, a locked storage opening, and a lock pin. The main body is configured to house an actuator. The unlocked storage opening and the locked storage opening are formed in the main body. The lock pin is selectively insertable into, and movable between, the unlocked storage opening and the locked storage opening. When the lock pin is in the unlocked storage opening, the lock pin does not engage the actuator. When the lock pin is in the locked storage opening, the lock pin engages at least a portion of the actuator.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
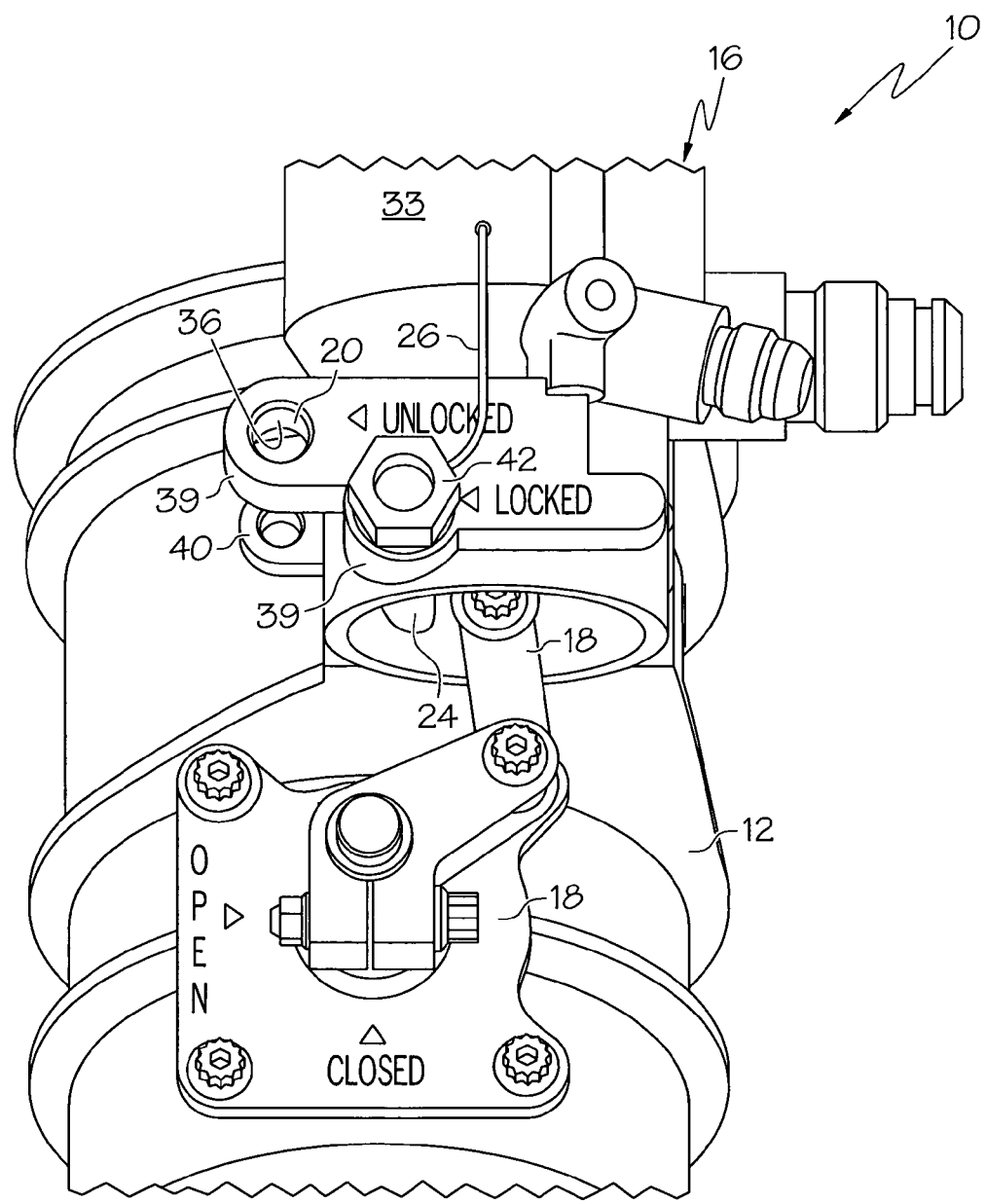
FIG. 1 depicts a front perspective view of a valve assembly with a lock, shown in the locked position.

The following detailed description of the invention is merely exemplary in nature and is not intended to limit the invention or the application and uses of the invention. Furthermore, there is no intention to be bound by any theory presented in the preceding background of the invention or the following detailed description of the invention.

FIGS. 1-6 depict an exemplary embodiment of a valve assembly 10, and components thereof. The valve assembly 10 includes a valve body 12, a valve element 14, an actuator housing 16, an actuator 18, an unlocked storage opening 20, a locked storage opening 22, and a lock 24.

Figure 4:
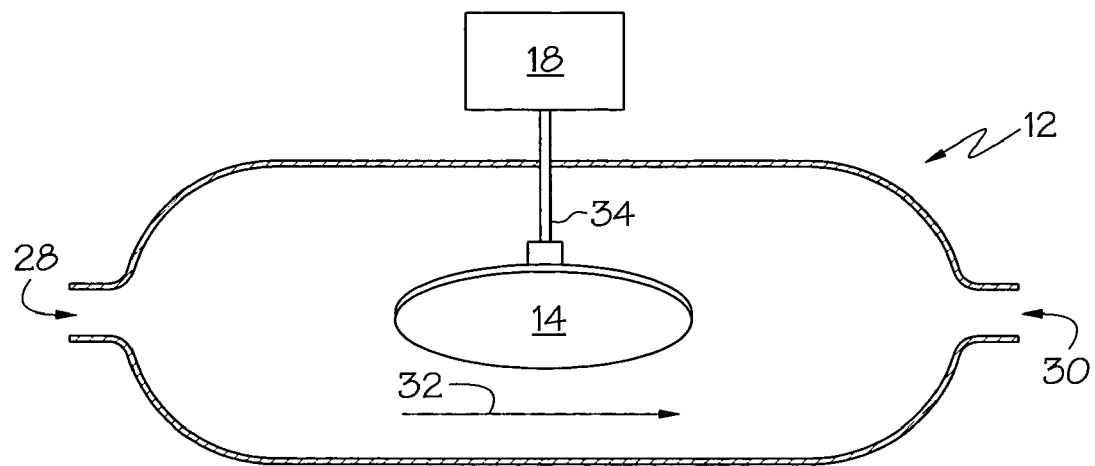
FIG. 4 depicts a schematic view of a valve element used in the valve assembly of FIG. 1, shown in the full-open position.
Figure 5:
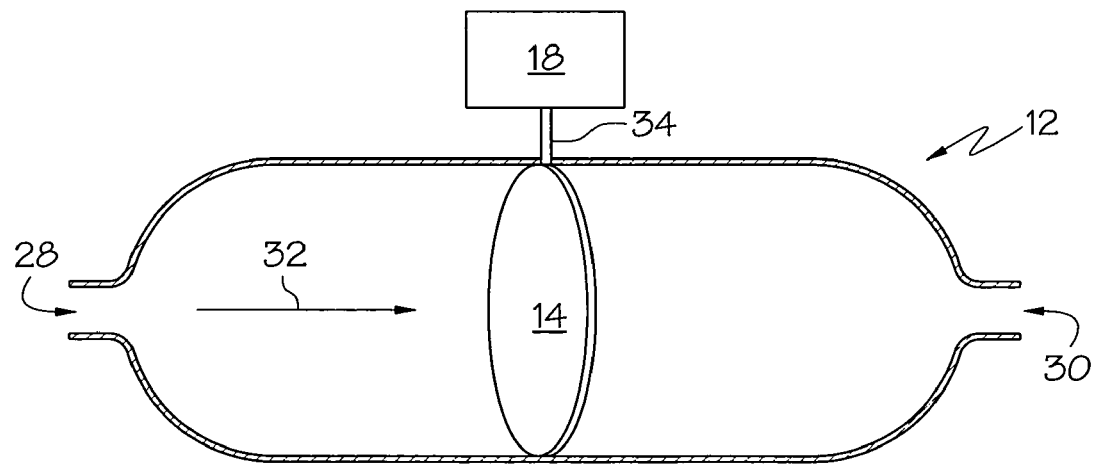
FIG. 5 depicts a schematic view of a valve element used in the valve assembly of FIG. 1, shown in the closed position.

Referring now to FIGS. 4 and 5, the valve body 12 has an inlet port 28, an outlet port 30, and a flow passage 32 therebetween. The valve element 14 is movably disposed within the valve body flow passage 32, and is movable between a full-open position (depicted in FIG. 4), in which air or other fluid is allowed to flow through the valve body flow passage 32, and a closed position (depicted in FIG. 5), in which air or other fluid is restricted from flowing through the valve body flow passage 32. It will be appreciated by one of skill in the art that in certain embodiments the valve element 14 may also be movable into intermediate positions between the full-open and closed positions, throttling fluid flow through the valve body flow passage 32. Generally, the closer the valve element 14 is to the full-open position, the more freely fluid is allowed to flow through the valve body flow passage 32, thereby increasing fluid pressure in the valve body flow passage 32 downstream of the valve element 14. Conversely, the closer the valve element 14 is to the closed position, the less freely fluid is allowed to flow through the valve body flow passage 32, thereby decreasing fluid pressure in the valve body flow passage 32 downstream of the valve element 14. In the embodiment depicted in FIGS. 4 and 5, the valve element 14 is a butterfly valve element. However, it will be appreciated that the valve element 14 may take any one of a number of different shapes, sizes and configurations. Moreover, the fluid controlled by the valve assembly 10 is preferably air, but can also be any one of numerous other types of gases or other types of fluid.

Figure 2:
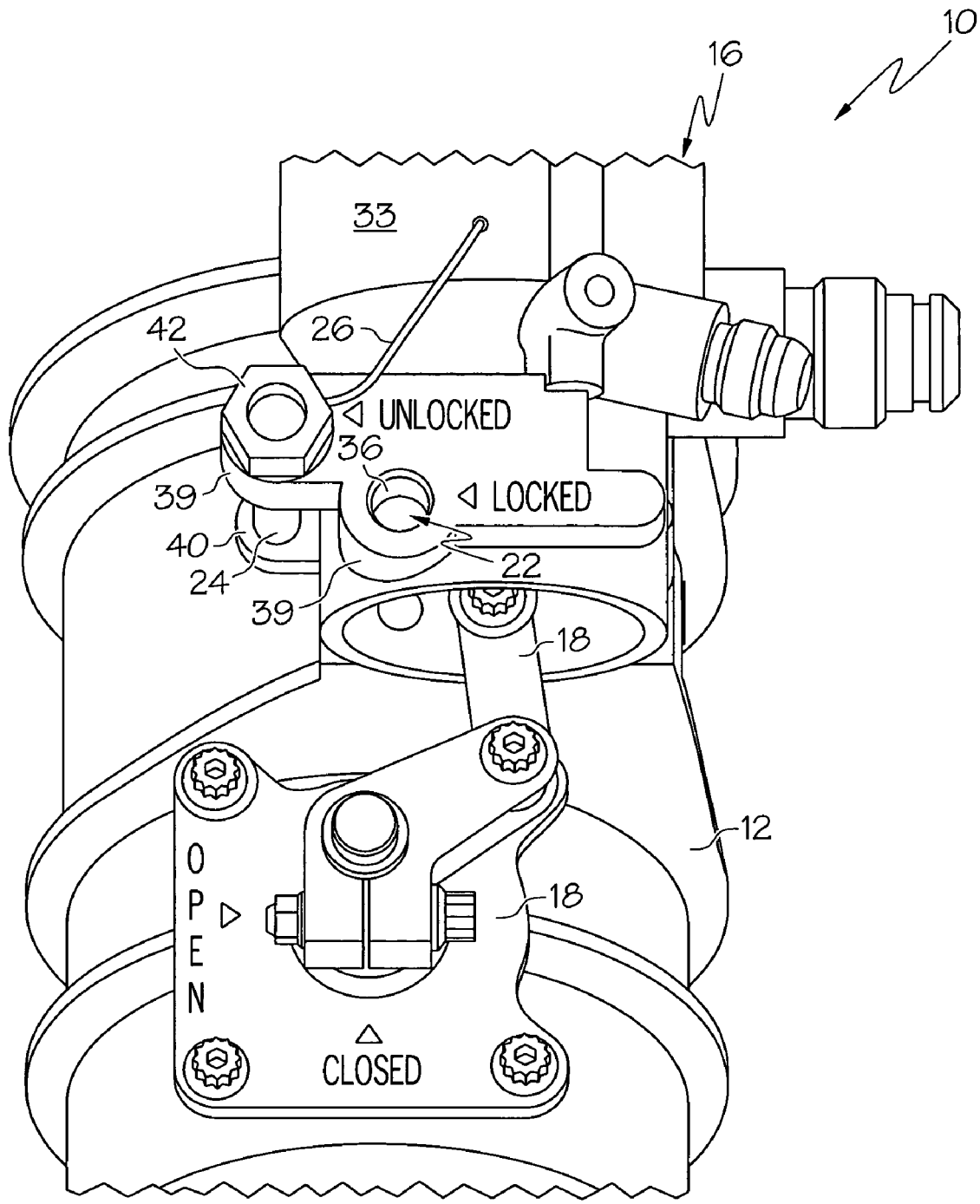
FIG. 2 depicts a front perspective view of the valve assembly of FIG. 1, shown in the unlocked position.
Figure 3:
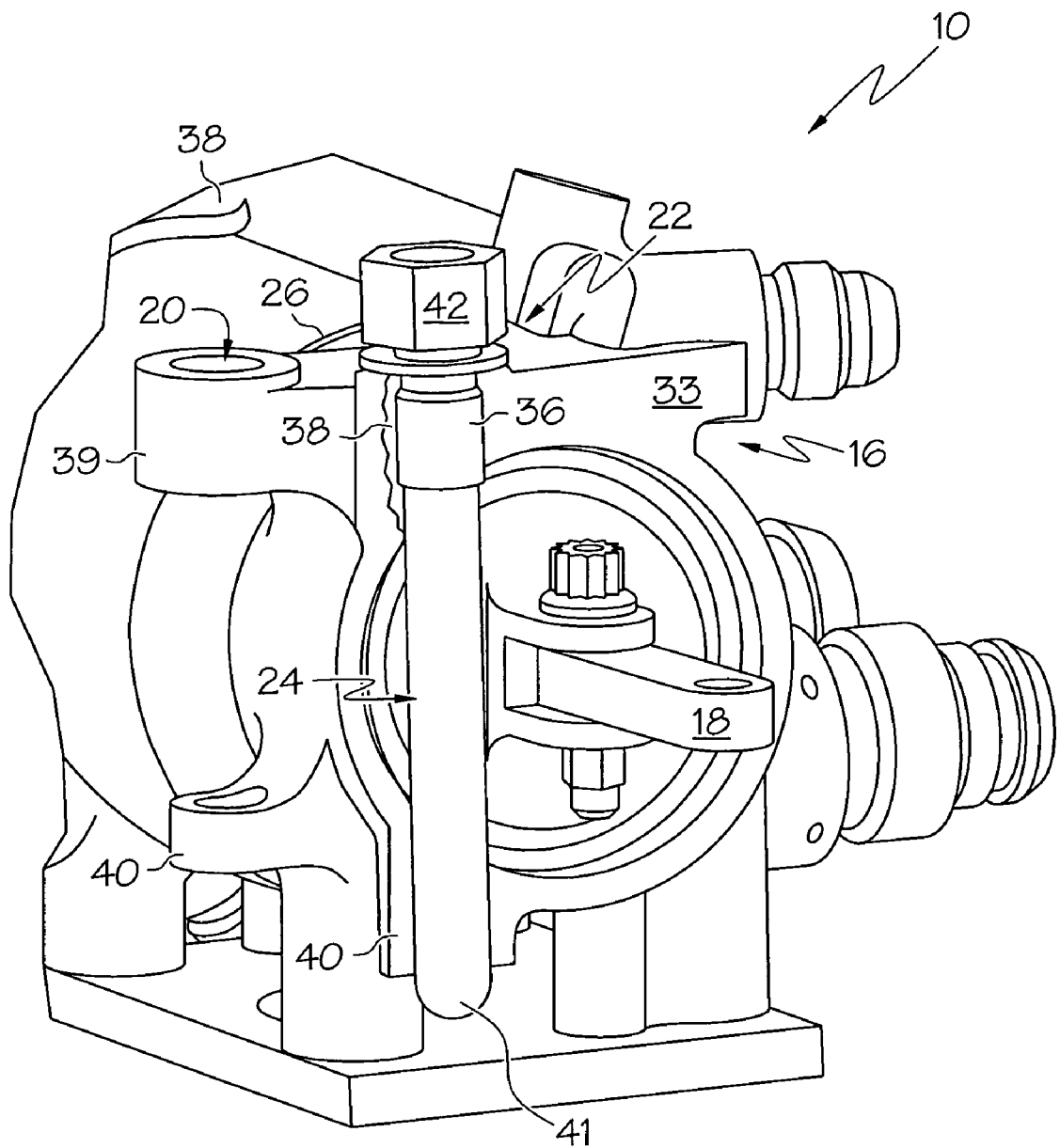
FIG. 3 depicts a cross section view of the valve assembly of FIG. 1, shown in the locked position.

Returning now to FIGS. 1-3, the actuator housing 16 is shown. As shown in FIGS. 1-3, the actuator housing 16 preferably includes a main body 33 wherein the unlocked and locked storage openings 20, 22 are formed. The actuator 18 is disposed within the actuator housing 16, and preferably within the main body 33. The actuator 18 is coupled to the valve element 14 (not visible in FIGS. 1-3), and is operable to at least facilitate movement of the valve element 14, as described above. For example, in one preferred embodiment shown in FIGS. 4-5, the actuator 18 may include, or may be coupled to, a shaft 34, which in turn is coupled to the valve element 14. However, it will be appreciated that the actuator 18 may take any one of a number of different shapes, sizes and configurations, and may move, or facilitate movement of, the valve element 14 in any one of a number of different ways. Regardless of the particular shape, size, configuration and operation of the actuator 18, the actuator 18 is at least partially disposed in the actuator housing 16.

Returning again to FIGS. 1-3, the unlocked storage opening 20 and the locked storage opening 22 are formed in the actuator housing 16, and are configured to allow storage of the lock 24 therein, so as to unlock or lock the valve assembly 10 as desired. The lock 24 is selectively insertable into, and movable between, the unlocked storage opening 20 and the locked storage opening 22. When the lock 24 is in the unlocked storage opening 20, as depicted in FIG. 2, the lock does not engage the actuator 18, and valve movement is thereby allowed. Conversely, when the lock 24 is in the locked storage opening 22, as depicted in FIGS. 1 and 3, the lock 24 engages at least a portion of the actuator 18, and valve movement is thereby at least inhibited, and preferably prevented.

The unlocked and locked storage openings 20, 22 preferably include threads 36 on at least a portion of the respective inner surfaces. These threads 36 are configured to mate with like threads 36 that are formed on a portion of the outer surface of the lock 24 (as described below). In addition, the locked storage opening 22 preferably includes a helical insert 38, as shown in FIG. 3, to at least facilitate securing the lock 24 when it is placed in the unlocked and/or locked storage openings 20, 22. Preferably, the helical insert 38 includes a plurality of helical coils, with one or more of the helical coils (preferably disposed approximately halfway along the helical insert 38 lengthwise) deformed to facilitate self-locking torque. The helical insert 38 helps the lock 24 to self-lock when in the unlocked and/or locked storage openings 20, 22. It will be appreciated that different embodiments for securing the lock 24 may be used in the unlocked storage opening 20 and/or the locked storage opening 22.

The shape and size of the unlocked and locked storage openings 20, 22 are preferably configured to allow a close fit with the lock 24 when disposed therein, to make it easy to insert and move the lock 24 therebetween, and to help avoid unwanted vibration or movement of the lock 24. For example, in the depicted embodiment of a cylindrical lock pin 24 with a specific diameter (as described below), the unlocked and locked storage openings 20, 22 preferably each include at least a first wall 39, shaped at least in part to hold a cylindrical pin, an inner diameter preferably slightly larger than the diameter of the lock 24. In a most preferred embodiment depicted in FIGS. 1-3, the unlocked and locked storage openings 20, 22 also each include a second wall 40 with a similar shape, with a slightly smaller diameter and disposed beneath the first wall 39, to help further guide and retain the lock 24 into place. These walls may be manufactured separately or as a single unit on the actuator housing 16, for example through line drilling, in order to align the walls and to keep a tight fit between the lock 24 and the unlocked and locked storage openings 20, 22. It will be appreciated that, in other embodiments, different shapes, sizes, configurations, and methods of manufacture may be used. However, regardless of the particular shapes, sizes, configurations, and methods of manufacture, the unlocked and locked storage openings 20, 22 are configured to allow the lock 24 to be inserted therein and moved therebetween.

The lock 24, as mentioned above, is selectively insertable into, and movable between, the unlocked storage opening 20 and the locked storage opening 22, and preferably has threads 36 configured to mate with the threads 36 formed in the unlocked and locked storage openings 20, 22. The lock 24 is preferably made of a high grade steel, such as Inconel 718.

Figure 6:
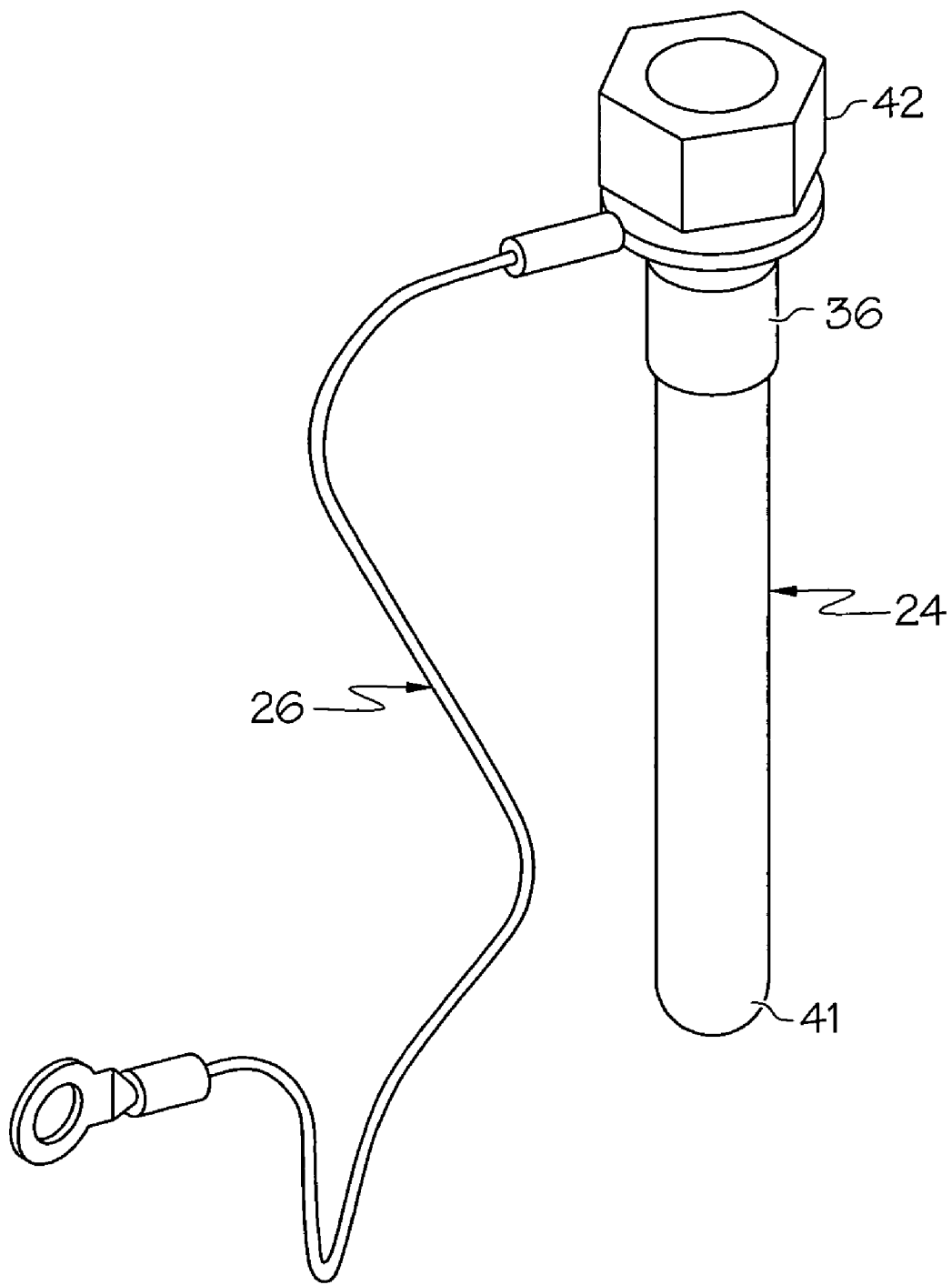
FIG. 6 depicts a front perspective view of a lanyard for use in the valve assembly of FIG. 1.

In the depicted embodiments, the lock 24 is in the shape of a cylindrical pin, with a diameter that forms a tight fit inside the unlocked and locked storage openings 20, 22. As shown in FIGS. 3 and 6, the lock 24 also preferably has a rounded end 41 configured to facilitate guiding the lock 24 down into the close fit created by the unlocked and locked storage openings 20, 22, and to help prevent wear on the lock 24. The lock 24 also preferably includes a head 42 configured to at least facilitate manual movement of the lock 24 into and between the unlocked and locked storage openings 20, 22. As depicted in FIGS. 1-3 and 6, the head 42 is most preferably hexagonal in shape, so that the head 42 may be easily manipulated by a wrench with one hand, for example by application of torque with the wrench. Then, when it is loose, the lock 42 can be removed by one hand, for example through the use of a single finger and thumb.

It will be appreciated that the lock 24 may not have a head 42 in certain embodiments, or may have a head 42 of a different shape, and/or that the lock 24 may otherwise have a different shape, size, or configuration, and/or be made of one or more different materials. However, regardless of its particular shape, size, or configuration, or the material from which it is made, the lock 24 is configured to engage at least a portion of the actuator 18 when the lock 24 is in the locked storage opening 22 (as depicted in FIGS. 1 and 3), thereby at least inhibiting, and preferably preventing, valve movement. Conversely, the lock 24 allows valve movement when the lock 24 is in the unlocked storage opening 20 (as depicted in FIG. 2).

Turning now to FIG. 6, the lock 24 may also include a lanyard 26. A larger, front perspective view of the lock 24 and lanyard 26 is provided in FIG. 6. The lanyard 26 is preferably attached to the lock 24 and coupled to the actuator housing 16, or other portion of the valve assembly 10. The lanyard 26 helps to ensure that the lock 24 is not inadvertently lost, for example during the process of manually moving the lock 24 into or between the unlocked or locked storage openings 20, 22. However, it will be appreciated that in certain embodiments a lanyard 26 may not be used, or that the lanyard 26 may be attached to the lock 24 and/or the actuator housing 16 in a position or manner different from that depicted in FIGS. 1-3 and 6.

The operation and use of the lock 24 is as follows, assuming that the lock 24 is initially in the unlocked storage opening 20, as depicted in FIG. 2. A torque can be applied to the head 42 of the lock, for example by hand with a wrench, to thereby un-mate the threads 36 on the lock 24 with the threads 36 formed in the unlocked storage opening 20. The lock 24 can then be manually moved out of the unlocked storage opening 20 and into the locked storage opening 22, for example by use of the same hand that first applied the torque to the head 42 of the lock 24. The optional lanyard 26 preferably remains screwed into the actuator housing 16, so that the lock 24 will not be lost in the unlikely event that the lock 24 is inadvertently or momentarily dropped. The threads 36 on the lock 24 are then mated with the threads 36 formed in the locked storage opening 22. Additionally, the lock 24 preferably further self-locks into place in the locked storage opening 22 by the helical insert 38 disposed therein. While in the locked storage opening 22, the lock 24 engages at least a portion of the actuator 18, and valve movement is thereby at least inhibited. Accordingly, the valve assembly 10 is thus locked in its current position.

Conversely, the valve assembly 10 can be unlocked as follows. A torque can be applied to the head 42 of the lock 24, to thereby un-mate the threads 36 on the lock 24 with the threads 36 formed in the locked storage opening 22. The lock 24 can then be manually moved out of the locked storage opening 22 and into the unlocked storage opening 20, for example using similar methods as those described above. The threads 36 on the lock 24 are then mated with the threads 36 formed in the unlocked storage opening 20. Accordingly, the valve assembly 10 is thus unlocked, thereby allowing the actuator 18 to move the valve element 14 between the open, closed, and/or intermediate positions.

It will be appreciated that the configuration of the valve assembly 10, and the various components thereof, can take any one of a number of different configurations. Regardless of the particular configuration, the valve assembly 10 allows the operator to lock and unlock the valve assembly 10, and thereby control movement of the valve element 14, easily with a single hand. More specifically, the configuration allows for such locking and unlocking in cases when only one hand is available, and/or when the valve assembly 10 is installed in an engine, for example onboard an airplane, and/or when visibility may be limited. Moreover, due to the self-locking mechanism of the lock 24, using the helical insert 38 of the locked storage opening 22, a user can manually accomplish the locking and unlocking process with the lock 24 without the need for screws, padlocks, or other components, thereby further simplifying the process.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A valve assembly, comprising:
    a valve body having an inlet port, an outlet port, and a flow passage therebetween;
    a valve element movably disposed within the valve body flow passage;
    an actuator housing;
    an actuator disposed within the actuator housing and coupled to the valve element, the actuator operable to move the valve;
    an unlocked storage opening formed in the actuator housing;
    a locked storage opening formed in the actuator housing;
    a single lock selectively insertable into, and movable between, the unlocked storage opening and the locked storage opening,
    wherein:
        when the single lock is in the unlocked storage opening, the single lock does not contact the actuator, and valve movement is thereby not inhibited, and
        when the single lock is in the locked storage opening, the single lock contacts at least a portion of the actuator, and valve movement is thereby completely inhibited.

2. The valve assembly of claim 1, further comprising:
    threads disposed on the single lock;
    first mating threads formed in the unlocked storage opening and configured to mate with the threads on the single lock; and
    second mating threads formed in the locked storage opening and configured to mate with the threads on the single lock.

3. The valve assembly of claim 2, wherein the second mating threads comprise:
    a helical insert disposed at least in the locked storage opening and configured to at least facilitate securing the single lock in the locked position when inserted into the locked storage opening.

4. The valve assembly of claim 1, further comprising:
    a lanyard attached to the single lock and coupled to the actuator housing.

5. The valve assembly of claim 1, wherein the single lock comprises a pin.

6. The valve assembly of claim 5, wherein:
    the lock further comprises a bottom portion that is at least substantially round in shape;
    the locked storage opening comprises:
        a first portion thereof having a first diameter; and
        a second portion thereof disposed beyond the first wall so that the single lock enters the first portion before entering the second portion when inserted into the locked storage opening, the second portion having a second diameter that is smaller than the first diameter; and
    the unlocked storage opening comprises:
        a first portion thereof having a first diameter; and
        a second portion thereof disposed beyond the first wall so that the single lock enters the first portion before entering the second portion when inserted into the unlocked storage opening, the second portion having a second diameter that is smaller than the first diameter.

7. The valve assembly of claim 1, wherein the single lock comprises a head configured to at least facilitate manual movement of the single lock into or between the unlocked and locked storage openings.

8. The valve assembly of claim 7, wherein the lock head is hexagonal in shape.

9. An actuator assembly for a valve, the actuator assembly comprising:
    an actuator housing;
    an actuator disposed within the actuator housing and configured to couple to a valve element;
    an unlocked storage opening formed in the actuator housing;

a locked storage opening formed in the actuator housing;
a single lock selectively insertable into, and movable between, the unlocked storage opening and the locked storage opening,
wherein:
when the single lock is in the unlocked storage opening, the single lock does not contact the actuator, and valve movement is thereby not inhibited, and
when the single lock is in the locked storage opening, the single lock contacts at least a portion of the actuator, and valve movement is thereby completely inhibited.

10. The actuator assembly of claim 9, further comprising:
threads disposed on the single lock;
first mating threads formed in the unlocked storage opening and configured to mate with the threads on the single lock; and
second mating threads formed in the locked storage opening and configured to mate with the threads on the single lock.

11. The actuator assembly of claim 10, wherein the second mating threads comprise:
a helical insert disposed at least in the locked storage opening and configured to at least facilitate securing the single lock in the locked position when inserted into the locked storage opening.

12. The actuator assembly of claim 9, further comprising:
a lanyard attached to the single lock and coupled to the actuator housing.

13. The actuator assembly of claim 9, wherein the single lock comprises a pin.

14. The actuator assembly of claim 13, wherein:
the single lock further comprises a bottom portion that is at least substantially round in shape;
the locked storage opening comprises:
a first portion thereof having a first diameter; and
a second portion thereof disposed beyond the first wall so that the single lock enters the first portion before entering the second portion when inserted into the locked storage opening, the second portion having a second diameter that is smaller than the first diameter; and
the unlocked storage opening comprises:
a first portion thereof having a first diameter; and
a second portion thereof disposed beyond the first wall so that the single lock enters the first portion before entering the second portion when inserted into the unlocked storage opening, the second portion having a second diameter that is smaller than the first diameter.

15. The actuator assembly of claim 9, wherein the single lock comprises a head configured to at least facilitate manual movement of the single lock into or between the unlocked and locked storage openings.

16. An actuator housing, comprising:
a main body configured to house an actuator for a valve;
an unlocked storage opening formed in the main body;
a locked storage opening formed in the main body;
a single lock pin selectively insertable into, and movable between, the unlocked storage opening and the locked storage opening,
wherein:
when the single lock pin is in the unlocked storage opening, the single lock pin does not contact the actuator, and valve movement is thereby not inhibited, and
when the single lock pin is in the locked storage opening, the single lock pin contacts at least a portion of the actuator, and valve movement is thereby completely inhibited.

17. The actuator housing of claim 16, further comprising:
threads disposed on the lock pin;
first mating threads formed in the unlocked storage opening and configured to mate with the threads on the single lock pin; and
second mating threads formed in the locked storage opening and configured to mate with the threads on the single lock pin.

18. The actuator housing of claim 17, wherein the second mating threads comprise:
a helical insert disposed at least in the locked storage opening and configured to at least facilitate securing the single lock pin in the locked position when inserted into the locked storage opening.

19. The actuator housing of claim 16, wherein:
the single lock pin includes a bottom portion that is at least substantially round in shape;
the locked storage opening comprises:
a first portion thereof having a first diameter; and
a second portion thereof disposed beyond the first wall so that the single lock pin enters the first portion before entering the second portion when inserted into the locked storage opening, the second portion having a second diameter that is smaller than the first diameter; and
the unlocked storage opening comprises:
a first portion thereof having a first diameter; and
a second portion thereof disposed beyond the first wall so that the single lock pin enters the first portion before entering the second portion when inserted into the unlocked storage opening, the second portion having a second diameter that is smaller than the first diameter.

20. The actuator housing of claim 16, wherein the single lock pin comprises a head configured to at least facilitate manual movement of the single lock pin into or between the unlocked and locked storage openings.

* * * * *